(12) United States Patent
Zork et al.

(10) Patent No.: US 7,661,681 B1
(45) Date of Patent: Feb. 16, 2010

(54) AUTOMATED SUSPENSION SYSTEM

(75) Inventors: John Zork, Leduc (CA); Wayne Rootsaert, Leduc (CA); Norman Woodward, Bellingham, WA (US)

(73) Assignee: Aspen Custom Trailers, Richmond, British Columbia (CA)

(*) Notice: Subject to any disclaimer, the term of this patent is extended or adjusted under 35 U.S.C. 154(b) by 0 days.

(21) Appl. No.: 12/179,852

(22) Filed: Jul. 25, 2008

(30) Foreign Application Priority Data

Jun. 30, 2008 (CA) .................................. 2636513

(51) Int. Cl.
*B60G 17/015* (2006.01)
(52) U.S. Cl. .................................................. 280/5.514
(58) Field of Classification Search ............... 280/5.514, 280/6.157, 124.159, 124.16, 124.161
See application file for complete search history.

(56) References Cited

U.S. PATENT DOCUMENTS

| | | | |
|---|---|---|---|
| 4,047,736 A | 9/1977 | Prive | |
| 4,089,544 A | 5/1978 | Raidel | |
| 4,517,832 A * | 5/1985 | Holland et al. | 73/117.03 |
| 4,634,142 A * | 1/1987 | Woods et al. | 280/5.503 |
| 5,725,239 A * | 3/1998 | de Molina | 280/5.503 |
| 6,371,227 B2 | 4/2002 | Bartlett | |
| 6,398,243 B1 * | 6/2002 | Hedenberg | 280/124.163 |
| 6,428,026 B1 | 8/2002 | Smith | |
| 6,471,196 B2 * | 10/2002 | Stiller | 267/64.16 |
| 6,685,211 B2 | 2/2004 | Iles | |
| 6,768,936 B2 | 7/2004 | Fiorletta | |
| 6,923,453 B2 | 8/2005 | Pivac | |
| 7,380,799 B2 * | 6/2008 | Niaura et al. | 280/5.519 |
| 2003/0015846 A1 * | 1/2003 | Rogala et al. | 280/5.514 |
| 2007/0200304 A1 * | 8/2007 | Brookes et al. | 280/5.514 |
| 2007/0290482 A1 * | 12/2007 | Schak | 280/477 |
| 2008/0023927 A1 * | 1/2008 | Kim et al. | 280/5.514 |

* cited by examiner

*Primary Examiner*—Paul N Dickson
*Assistant Examiner*—Robert A Coker
(74) *Attorney, Agent, or Firm*—Michael A. Glenn; Glenn Patent Group

(57) ABSTRACT

A suspension system for towed vehicles automatically adjusts for different payloads and road conditions without the need for manual shims used in prior art suspensions. automatically adjusts a mechanical bias on the vehicle to keep the suspension within a preferred ride height range. A hydraulic cylinder between the frames of the towing and the towed vehicles provides a mechanical biasing force to the towed vehicle. A sensor measures the ride height and causes the hydraulic cylinder to retract or extend according to the bias needed to maintain the suspension in the preferred ride height range.

10 Claims, 2 Drawing Sheets

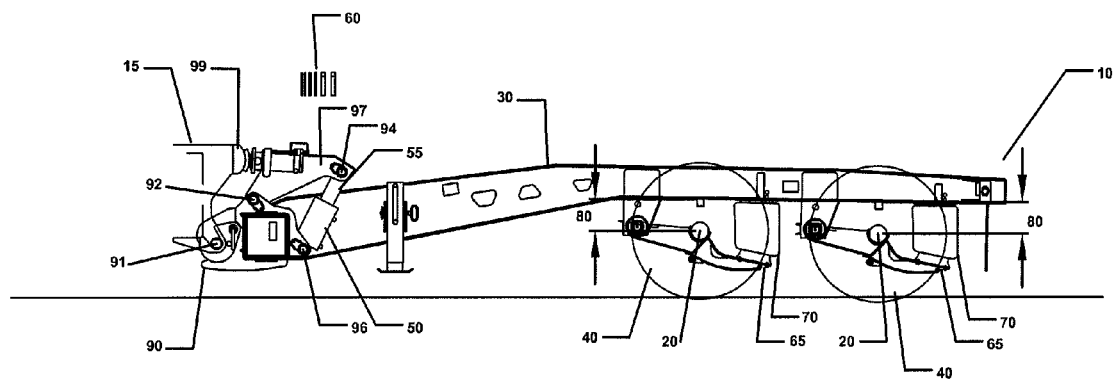
FIG. 1 - PRIOR ART
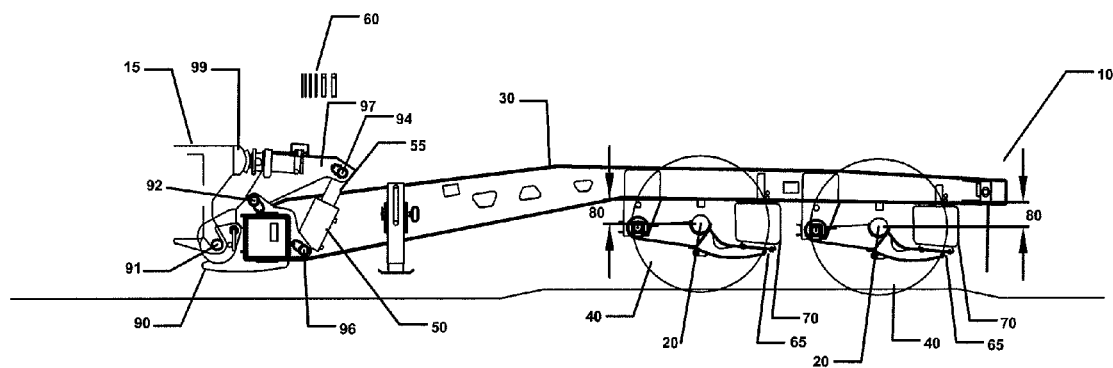
FIG. 2 - PRIOR ART
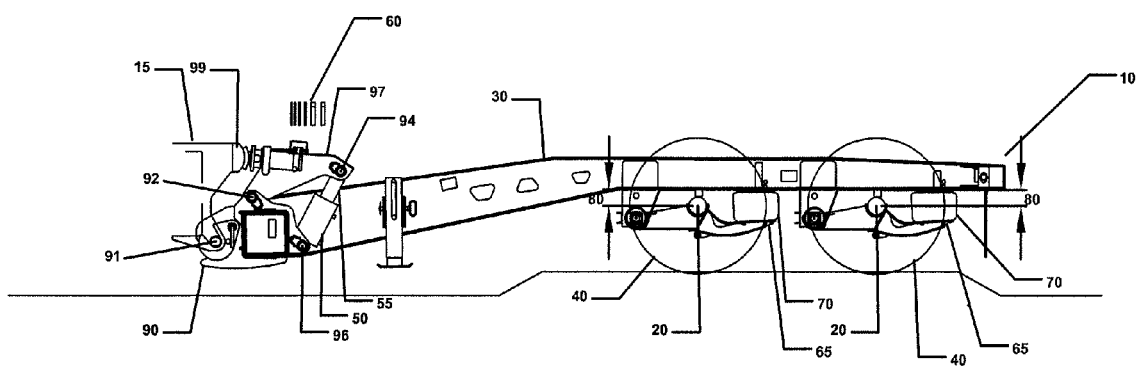
FIG. 3 - PRIOR ART

AUTOMATED SUSPENSION SYSTEM

FIELD OF THE INVENTION

The present invention relates to a vehicle suspension system, and in particular to a suspension system for towed load-sharing vehicles used with trailers, such as boosters and tag dollies.

BACKGROUND OF THE INVENTION

Vehicle suspension systems are important for both maintaining vehicle control and for isolating a vehicle's contents from bumps and vibrations caused by imperfections in the road. Typical suspension systems may utilize one or more of springs, shock absorbers (or dampers), hydraulic cylinders and air bags.

Isolating the vehicle's contents from bumps and vibrations caused by road imperfections allows the vehicle to ride relatively undisturbed. Suspension systems are designed to absorb the energy generated when the vehicle rides over unevenness on the road and to dissipate the energy without causing undue vertical movement of the vehicle body.

A proper suspension system also assists in maintaining vehicle control by minimizing weight transfer of the vehicle from side to side and from front to back that occurs during movement, braking and acceleration. This allows all of the wheels to better maintain contact with the ground, and maintains the vehicle's ability to steer, brake, and accelerate.

The present invention relates to towed vehicles used to carry a payload such as trailers, as well as to their load-sharing accessory vehicles known as tag dollies and boosters. For simplicity, the term "dollies" will be used to refer collectively to all of such accessory vehicles.

An effective dolly suspension system may help to prevent "bridging", a condition that occurs when the wheels from one or more axles unload, or lose contact with the ground, typically caused by uneven road conditions. As a result, the entire load is borne by the remaining axles which may damage the dolly, and cause reduced brake performance or even loss of control if the axles are self-steering.

Air bag suspension systems have an "air bag performance zone" defined by the manufacturer. The air bag performance zone determines the preferred range of ride heights, defined as the distance between axle and the frame. It is important that the suspension system maintain a ride height within this preferred ride height range in order to provide the most effective suspension and to ensure optimal performance and operating life for the air bags. One prior art suspension system for a dolly includes both a hydraulic bias mechanism (comprising one or more hydraulic cylinders) and an air suspension mechanism (comprising one or more air bags). In normal operation, the hydraulic cylinders are fully extended thereby acting effectively as struts between the towing vehicle and the dolly to bias the dolly frame toward the ground. The air bags provide the suspension performance. In the event that the air bags threaten to collapse, the cylinders are immediately retracted to reduce the downward bias of the dolly and to relieve the air bags. The operator of the dolly manually adjusts the suspension system upon loading or unloading cargo so that the ride height falls within the preferred range by removing or inserting metal shims in the hydraulic bias system so as to increase or decrease the downward bias. The manual removal and insertion of shims according to the payload is time-consuming.

The distribution of the load can also be affected by a significant change in road conditions, such as an abrupt change in road grade or cornering an elevated curve. This change in distribution can affect the ride height and create handling problems.

When the dolly is traveling, variations on the surface of the road may affect the ride height as well. For example, if the dolly encounters a bump on the road, the wheel (and axle) will experience upward vertical acceleration and rise, resulting in the compression of the air bags and instantaneous variations in the ride height that are normally compensated for by the air suspension system. If the bumps on the road are extreme, the air suspension system may be driven outside the air bag performance zone, bottom out and cease to provide suspension. This condition has a negative impact on the handling of the dolly and may lead to damage to the suspension and to the dolly. In prior art suspension systems that use a hydraulic bias system to achieve a nominal ride height, when the air suspension mechanism has collapsed, the hydraulic bias mechanism is activated on an emergency basis to decrease the load on the air suspension. This usually results in a violent jolt to the dolly, which is uncomfortable and potentially damaging to the cargo.

It is therefore an object of the present invention to provide a suspension system that overcomes the aforementioned limitations.

The particular objects of the invention will be better understood by reference to the detailed description of the preferred embodiment that follows.

SUMMARY OF THE INVENTION

In one aspect, the invention comprises a suspension system for a first vehicle and a load-sharing accessory vehicle comprising a suspension extending between a frame and at least one axle of the accessory vehicle and at least one biasing mechanism (comprising at least one hydraulic cylinder with a piston) between the first vehicle and the frame of the accessory vehicle to bias the frame toward the axle of the accessory vehicle. A sensor determines the ride height of the frame in relation to the axle and a controller automatically operates the hydraulic cylinder to effect the extension or retraction of the piston to adjust the bias and thereby control the ride height.

In another aspect, the invention is a method for controlling the nominal ride height of a dolly having a frame supported by at least one suspension on one or more axles. According to the method, the ride height is determined by measuring the distance of the axle from the frame. A piston within a hydraulic cylinder between the first vehicle and the frame of the accessory vehicle, that provides biasing of the frame toward the axles is selectively retracted or extended to adjust the ride height by reference to a predetermined ride height range.

In relation to dollies specifically, the invention comprises a suspension system for a dolly comprising at least one suspension supporting at least one axle of the dolly and at least one hydraulic cylinder with a piston in operative relationship between a trailer and the dolly for providing downward bias to the dolly frame. An automatic sensor determines the ride height of the dolly and a controller operates the hydraulic cylinder to effect the extension or retraction of the piston to adjust the ride height if the instantaneous or an average ride height falls outside a predetermined range.

In another aspect, the invention is a method for controlling the ride height of a dolly having a frame supported by at least one suspension on one or more axles. According to the method, the ride height is determined by measuring the distance between the axle and the frame. A piston within a hydraulic cylinder between the first vehicle and the frame of the accessory vehicle, that provides load biasing to the dolly in relation to the trailer is selectively retracted or extended to adjust the ride height if the instantaneous or an average ride height is outside a predetermined range.

In a further aspect of the invention, a history of recent ride height readings is maintained and the piston is selectively retracted or extended to adjust the nominal ride height as a function of the history of recent ride height readings.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

The invention will be described by reference to the detailed description of the preferred embodiment and to the drawings thereof in which:

FIG. 1 is a side elevation of a prior art suspension system for a dolly with the dolly travelling over level ground;

FIG. 2 is a side elevation of a prior art suspension system for a dolly with the dolly travelling over uneven ground;

FIG. 3 is a side elevation of a prior art suspension system for a dolly with the dolly travelling over extremely uneven ground;

DETAILED DESCRIPTION OF THE PREFERRED EMBODIMENT

Figure 4:
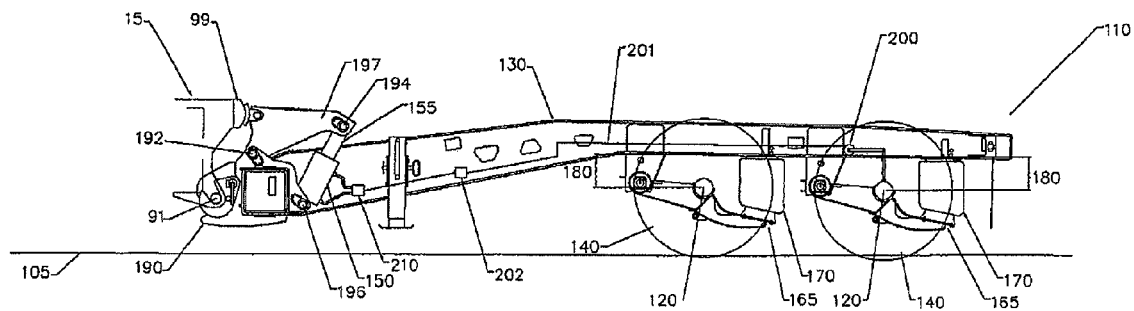
FIG. 4 is a side elevation of a suspension system for a dolly according to the preferred embodiment of the invention, with the dolly travelling over level ground.

FIGS. 1 to 3 illustrate a suspension system for a dolly 10 according to the prior art. The right and left sides of the suspension system are similar so only the left side is shown.

The suspension system comprises an air suspension mechanism generally indicated by the numeral 65, comprising an air bag 70. The air bag 70 supports the frame 30 of the dolly 10 over axles 20. One or more wheels 40 are attached to each of the axles 20. A hydraulic cylinder 50 is located forward of the air suspension mechanism 65 and includes a piston 55. The dolly 10 is attached to the rear of a trailer using a grip 90. The hydraulic cylinder 50 is pivotably connected to the grip 90 at cylinder pivot 96 and is pivotally connected to one end of arm 97 at piston pivot 94. The rear of the tractor unit or the rear of the other trailer (indicated generally by the numeral 15) is attached to the dolly 10 by pivotally connecting the grip 90 to a horizontal tube 91 on the tractor unit or the other trailer. The hydraulic cylinder and the associated linkages act to provide a load biasing force on the dolly 10 in relation to the trailer.

In normal travel, the piston 55 is maintained at a constant extension and acts like a strut. Upon loading or unloading the trailer and therefore its load-sharing dolly, a ride height 80 must be adjusted to the preferred ride height range. This is done by inserting one or more shims 60 into the arm 97 before the piston is extended. Shims 60 (shown in an exploded view in FIGS. 1 to 6) adjust the position of the hydraulic cylinder 50 with respect to the frame 30. As more shims 60 are inserted, the piston pivot 94 is urged clockwise to change the load biasing on the dolly. Conversely, when shims 60 are removed, the piston pivot 94 is urged counterclockwise.

The number of shims 60 that are required is dependent on the portion of the load that is supported by the dolly 10. A heavier load exerts a greater downward force on the frame 30 near the axle 20. This would normally tend to compress the air bag 70, lower the rear of the frame 30, and decrease the ride height 80, or require greater compression of the air bags to maintain the ride height. To adjust the ride height 80 to keep it within the preferred range and to maintain the air bags within their performance zone, fewer shims 60 are inserted. When lighter payloads are involved, more shims 60 are inserted to urge the piston pivot 94 lower and towards the rear of the dolly 10 to keep the frame from rising above the preferred ride height range.

When operating over extremely uneven road (as shown in FIG. 3), it is possible that the air suspension mechanism 65 will be unable to fully compensate for large bumps in the road and will bottom out. In such circumstances, a fail-safe causes the piston 55 to quickly retract (in a violent decompression), causing the arm 97 to withdraw from abutment with block 99. This relieves any downward bias force exerted by the hydraulic cylinder 50 on the frame 30 and allows the air bag 70 to recover.

Figure 5:
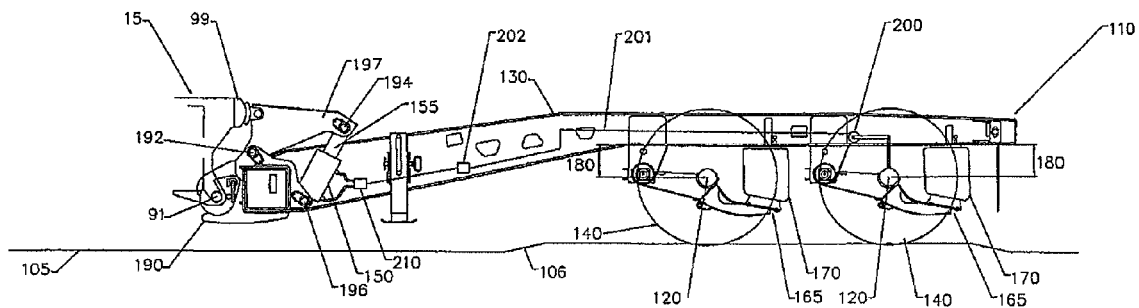
FIG. 5 is a side elevation of a suspension system for a dolly according to the preferred embodiment of the invention, with the dolly travelling over uneven ground.
Figure 6:
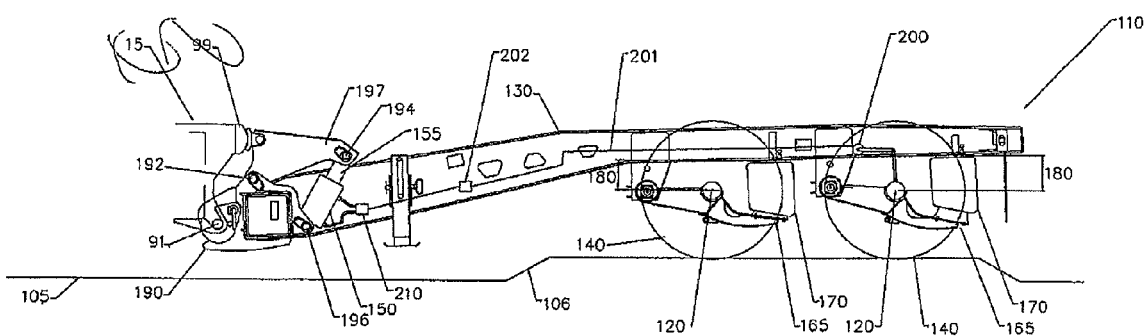
FIG. 6 is a side elevation of a suspension system for a dolly according to the preferred embodiment of the invention, with the dolly travelling over extremely uneven ground.

FIGS. 4 to 6 illustrate the preferred embodiment of the present invention. The suspension system for a dolly 110 according to the preferred embodiment comprises a hydraulic load biasing mechanism, an air suspension mechanism, a sensor 200 and a controller 202 located on the dolly 110. The hydraulic load biasing mechanism includes at least one hydraulic cylinder 150 having a piston 155, and the air suspension mechanism consists of one or more air bags 170. The controller 202 includes a microprocessor that is in electrical communication with the sensor 200 and with the hydraulic load biasing mechanism through a control line 201. A frame 130 of the dolly 110 is supported on an axle 120 by the air bag 170. Sensor 200 is attached between the frame 130 and the axle 120 and measures the amount of axle travel or deflection with respect to the frame 130. The magnitude of axle deflection is used to calculate the ride height 180 of the dolly 110. The controller 202 receives data input from the sensor 200 regarding the magnitude of axle deflection and transmits control signals through a control signal line to a hydraulic control system 210 connected to the hydraulic cylinder 150 to effect the extension or retraction of the piston 155 to control the amount of downward bias force exerted on the frame by the hydraulic biasing system.

The dolly 110 is attached to the rear of a trailer using a grip 190. As in the prior art, the rear of the trailer is attached to the dolly 110 by pivotally connecting the grip 190 to a horizontal tube 91 on the trailer. The hydraulic cylinder 150 is pivotably connected to the grip 190 at cylinder pivot 196 and pivotably connected to one end of an arm 197 and to the frame 130 at arm pivot 192. The other end of arm 197 is pivotally connected to the piston 155 at piston pivot 194.

The configuration and linkages between the grip 190, arm pivot 192, piston pivot 194, cylinder pivot 196 and arm 197 results in a downward load bias force on the dolly frame 130, allowing the ride height of the unloaded dolly to remain within the preferred ride height range that has been provided by the air suspension system supplier, or that is determined by the user.

When the trailer is loaded, the air bag 170 of the load-sharing dolly tends to compress, decreasing the ride height 180. Depending of the weight of the payload, the resulting ride height 180 may be below the preferred ride height range, were it not for the system of the invention. In accordance with the invention, sensor 200 detects the change in the amount of axle deflection with respect to the frame 130 and corresponding data is sent to the controller 202. The controller 202 recognizes that the ride height is below the preferred ride height range and sends a control signal to the solenoid operated control valve 210 to cause piston 155 to retract within the hydraulic cylinder 150. Retraction of the piston 155 decreases the downward bias on the dolly frame, resulting in an increase in the ride height 180. When the controller 202 (through the sensor 200) detects that the axle deflection (and consequently the ride height 180) has reached a nominal or target ride height within the preferred ride height range, the controller 202 sends a signal to the solenoid operated control valve 210 to stop the retraction of piston 155. Typically the nominal ride height will be centered within the preferred ride height range. Conversely, when the dolly is unloaded, the system of the invention can sense a overly high ride height and extend the piston to provide a compensating downward bias on the dolly frame.

By automatically monitoring the amount of axle deflection (and consequently ride height 180) and by automatically controlling the amount of the extension of the piston 155 within the hydraulic cylinder 150 such that the ride height 180 falls within the preferred ride height range, the need to manually insert and remove shims 60 into the arm 197 after loading and unloading is eliminated.

In addition to operating after loading and unloading, the suspension system also operates while the dolly 110 is subjected to dynamic loading during travel. The sensor 200 continuously monitors the axle deflection, and consequently the ride height 180. When traveling on an even road (as shown in FIG. 4), there is little axle travel, and the ride height 180 does not deviate from the preferred ride height range. Under such conditions, the air bag may compensate for any minor unevenness on the road and maintain the ride height 180 within the preferred ride height range without the need for intervention by the controller 202 and the hydraulic cylinder 150.

When the dolly 110 is traveling on an uneven road (as shown in FIG. 5), there may be instances of greater instantaneous dynamic loads caused by bumps. For example, when the wheel travels over a bump 106, the wheel 140 and axle 120 experience an upward vertical acceleration, which should be counteracted by the air suspension mechanism 165 in order to maintain a smooth ride for the frame 130. However, this upward vertical acceleration by the wheel 140 and axle 120 caused by the bump 106 in the road 105 may result in the compression of the air bag 170, a decrease in the amount of axle deflection and a decrease in the ride height 180. This is monitored by the sensor 200 and the corresponding data is sent to the controller 202. If the ride height 180 moves out of a predetermined ride height range, the controller 202 sends a control signal to the hydraulic control system 210 to effect retraction of piston 155. This reduces the downward bias on the dolly frame. The converse applies when riding down a bump. With the controller 202 continually monitoring, and if necessary adjusting, the extent and magnitude of the retraction of the piston 155 based on data received from the sensor 200 regarding axle deflection, the ride height 180 is maintained in the preferred ride height range.

In the preferred embodiment, the controller 202 maintains in memory a history of the most recent readings regarding axle deflection detected by the sensor 200 and uses this history to adjust the current extent of the retraction or extension of the piston 155 within the hydraulic cylinder 150. This is particularly useful when loading or unloading the dolly, or when the dolly is stationary for a period of time, for example on a partially inclined surface. For example, this history may comprise the readings regarding axle deflection detected by the sensor 200 within the last 15 seconds. While the response of the system will accommodate instantaneous out of range variations in ride height as described above, it will be useful to rely on a running average over a predetermined period of time to change the set point of the cylinders to keep the ride height within the optimal range to maintain the air bags in their performance zone, without the system continually sensing and reacting to an extended an out of range condition.

When engaging a steep change of grade, the load on the dolly will change as the trailer has engaged the new grade but the dolly is still substantially on the old grade. Although not a bump in the road, the effect on the ride height is similar. The change in load on the dolly will translate to a change in ride height. The system of the invention accommodates this scenario by detecting the change in ride height and adjusting the load bias accordingly. A similar situation occurs when the trailer engages a turn on a sloped corner. As the trailer exits the turn, it re-enters even grade while the dolly may still be on the sloped corner, or on the edge of a ditch. The change in ride height on one side of the dolly will cause the system of the invention to actuate to keep the ride height within acceptable limits. Because these latter two scenarios are likely to present themselves in less than a 15 second period, operation of the system contemplates either analyzing a shorter period of ride height history (for example 5 seconds or less) or the actuation of a more instantaneous response when a separate indicator signals that a turn or a significant change in grade have been engaged.

It should be understood that although only one hydraulic cylinder 150 and one air bag 170 are depicted in FIGS. 4 to 6, there may be more than one hydraulic cylinder 150 and more than one air bag 170 in the suspension system of the present invention. Particularly, there may be two hydraulic cylinders, one located on either side of the dolly 110. The hydraulic cylinders act in concert with each other (i.e. the pistons of the hydraulic cylinders retract and extend at the same time and are commonly controlled by the controller 202).

It should be understood that there may be more than one axle present on the dolly 110. If there are multiple axles (and thereby multiple pairs of wheels connected to the axles), there may be more than one air bag 170 on the dolly 110 (e.g. there may be one air bag per axle).

It will be appreciated by those skilled in the art that the preferred and alternative embodiments have been described in some detail but that certain modifications may be practiced without departing from the principles of the invention.

What is claimed is:

1. A suspension system for a first vehicle and a load-sharing accessory vehicle, said suspension system comprising:

An air ride suspension extending between a frame of said accessory vehicle and at least one axle of said accessory vehicle:

a biasing mechanism between said first vehicle and said frame including at least one hydraulic cylinder and a piston for providing a bias between said first vehicle and said frame;

an automatic sensor configured to determine a ride height of said frame in relation to said axle;

a controller configured to effect extension or retraction of said piston to adjust the magnitude of said bias and thereby control said ride height.

2. The suspension system of claim 1 wherein said controller is configured to effect extension or retraction of said piston to adjust said bias and thereby adjust a nominal ride height in relation to a predetermined preferred ride height range for said air ride suspension system.

3. The suspension system of claim 1, wherein said controller is further operable to signal said hydraulic cylinder to effect extension or retraction of said piston within said hydraulic cylinder to maintain said ride height within a predetermined ride height range.

4. A method for controlling the nominal ride height of a load-sharing accessory vehicle attached to a first vehicle, said load-sharing accessory vehicle having a frame supported by at least one air ride suspension on one or more axles, said method comprising:
   determining a ride height by measuring the distance between at least one of said axles and said frame;
   selectively retracting or extending a piston within a hydraulic cylinder that provides biasing to said frame in relation to said one or more axles so as to adjust said ride height.

5. The method of claim 4 wherein said adjustment of a ride height is by reference to a predetermined ride height range.

6. A suspension system for a load-sharing accessory vehicle attached to a first vehicle comprising:
   at least one air ride suspension supporting at least one axle of said accessory vehicle;
   at least one hydraulic cylinder with a piston in operative relationship between said first vehicle and accessory vehicle for providing bias to said accessory vehicle;
   an automatic sensor configured to determine a ride height of said accessory vehicle; and,
   a controller configured to effect the extension or retraction of said piston to adjust a nominal ride height if the instantaneous or an average ride height is outside a predetermined range.

7. The system of claim 1 or 6 further comprising a memory for maintaining a record of recent ride height readings and wherein said extension or retraction is a function of a history of recent ride height readings.

8. A suspension system for a load-sharing accessory vehicle to a first vehicle, said accessory vehicle comprising:
   at least one air bag supporting an axle of said accessory vehicle;
   at least one hydraulic cylinder having a piston, said hydraulic cylinder and piston being in operative relationship between said accessory vehicle and said first vehicle;
   characterized in that said suspension system further comprises:
   at least one sensor operable to detect a ride height of said accessory vehicle;
   a controller operable to receive data from said sensor relating to said ride height and operable to signal said hydraulic cylinder to effect extension or retraction of said piston within said hydraulic cylinder to control said ride height when said accessory vehicle is attached to said first vehicle.

9. A method for controlling a ride height of a load-sharing accessory vehicle comprising a frame supported by one or more air bags on one or more axles, said method comprising the steps of:
   detecting said ride height of said accessory vehicle by measuring the amount of deflection of said axles of said accessory vehicle from said frame;
   retracting or extending each of one or more pistons within respective one or more hydraulic cylinders located forward of said air bags, wherein said retracting or extending of said pistons causes a biasing force on said frame with respect to said axles; and
   discontinuing the retracting or extending of said pistons when said ride height is within a predetermined range of ride height.

10. The method of claim 4 or 9 further comprising the step of maintaining a record of recent ride height readings and wherein said extension or retraction is a function of said record of recent ride height readings.

* * * * *